United States Patent
Papasakellariou et al.

(10) Patent No.: US 9,288,821 B2
(45) Date of Patent: *Mar. 15, 2016

(54) METHOD AND APPARATUS FOR TRANSMITTING AND RECEIVING SCHEDULING ASSIGNMENTS IN A COMMUNICATION SYSTEM

(71) Applicant: Samsung Electronics Co., Ltd., Gyeonggi-do (KR)

(72) Inventors: Aris Papasakellariou, Dallas, TX (US); Soeng Hun Kim, Gyeonggi-do (KR); Gert-Jan Van Lieshout, Apeldoorn (NL)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/262,142

(22) Filed: Apr. 25, 2014

(65) Prior Publication Data

US 2014/0233499 A1 Aug. 21, 2014

Related U.S. Application Data

(63) Continuation of application No. 13/705,803, filed on Dec. 5, 2012, now Pat. No. 8,832,516, which is a continuation of application No. 12/560,876, filed on Sep. 16, 2009, now Pat. No. 8,352,821.

(60) Provisional application No. 61/098,074, filed on Sep. 18, 2008.

(51) Int. Cl.
*H04W 72/12* (2009.01)
*H04L 5/00* (2006.01)
*H04L 1/00* (2006.01)

(52) U.S. Cl.
CPC ......... *H04W 72/1273* (2013.01); *H04L 1/0061* (2013.01); *H04L 5/006* (2013.01); *H04L 5/0048* (2013.01); *H04W 72/12* (2013.01); *H04W 72/1205* (2013.01); *H04W 72/1289* (2013.01)

(58) Field of Classification Search
CPC ... H04L 1/0061; H04L 5/0053; H04W 72/12; H04W 72/1289; H04W 72/0413; H04W 72/1205; G06F 11/0793; G06F 11/0709; H05K 999/99

USPC ............ 714/748, 712, 736, 758, E11.04; 370/312, 328, 329, 252, 431

See application file for complete search history.

(56) References Cited

U.S. PATENT DOCUMENTS

| | | | |
|---|---|---|---|
| 4,763,248 A | 8/1988 | Kitada | |
| 5,740,460 A * | 4/1998 | Wise et al. | ..... 348/473 |

(Continued)

FOREIGN PATENT DOCUMENTS

| | | |
|---|---|---|
| KR | 1020060123654 | 12/2006 |
| KR | 1020080040108 | 5/2008 |
| WO | WO 2008/024890 | 2/2008 |

OTHER PUBLICATIONS

R1-082541—LS Response to Semi-Persistent Scheduling Activation with Single PDCCH LS (R2-082892) on "Semi-Persistent Scheduling Activation with Single PDCII" From TSG-RAN WG2; Qualcomm Europe (TSG-RAN WG1) 3GPP TSG RAN WG1 Meeting #53bis, Jun. 30-Jul. 4, 2008; (2PG).

(Continued)

*Primary Examiner* — Phung M Chung
(74) *Attorney, Agent, or Firm* — The Farrell Law Firm, P.C.

(57) ABSTRACT

A method and apparatus for receiving a Scheduling Assignment (SA) by a User Equipment (UE) in a communication system in which a base station transmits the SA being a first type or a second type, the SA including a set of Information Elements (IEs), and a first IE. The method includes receiving the SA; identifying that each bit included in the set of IEs of the SA and at least one bit included in the first IE of the SA are set with a predetermined value; and performing an action corresponding to the SA of the second type, if each bit included in the set of IEs of the SA and the at least one bit included in the first IE of the SA are set with the predetermined value.

12 Claims, 10 Drawing Sheets

(56) References Cited

U.S. PATENT DOCUMENTS

| | | | |
|---|---|---|---|
| 6,963,545 B1 | 11/2005 | Ho | |
| 7,721,337 B2 | 5/2010 | Syed | |
| 7,756,081 B2* | 7/2010 | Park et al. | 370/329 |
| 7,996,029 B2* | 8/2011 | Chun et al. | 455/509 |
| 8,005,071 B2 | 8/2011 | Kim | |
| 8,073,062 B2 | 12/2011 | Classon et al. | |
| RE44,203 E* | 5/2013 | Chun et al. | 455/509 |
| 8,437,291 B2* | 5/2013 | Park et al. | 370/329 |
| RE45,138 E* | 9/2014 | Chun et al. | 455/509 |
| 8,837,450 B2* | 9/2014 | Papasakellariou et al. | 370/342 |
| 2006/0251105 A1* | 11/2006 | Kim et al. | 370/449 |
| 2007/0189199 A1 | 8/2007 | Nishio | |
| 2008/0267118 A1 | 10/2008 | Cai et al. | |
| 2009/0245194 A1* | 10/2009 | Damnjanovic et al. | 370/329 |
| 2009/0287976 A1* | 11/2009 | Wang et al. | 714/748 |
| 2010/0238875 A1 | 9/2010 | Sung et al. | |
| 2010/0278225 A1 | 11/2010 | Chun et al. | |
| 2011/0099447 A1 | 4/2011 | Park et al. | |
| 2011/0103290 A1 | 5/2011 | Suzuki et al. | |
| 2011/0164489 A1* | 7/2011 | Papasakellariou et al. | 370/203 |
| 2011/0194502 A1 | 8/2011 | Sung et al. | |
| 2013/0315180 A1* | 11/2013 | Papasakellariou et al. | 370/329 |
| 2013/0343334 A1* | 12/2013 | Papasakellariou et al. | 370/329 |

OTHER PUBLICATIONS

R1-082542—Details on Semi-Persistent Scheduling Activation with Single PDCCH; Qualcomm, TSG-RAN WG1 #53bis, Jun. 30-Jul. 4, 2008; (6PG).

R1-082766—LS Response to Semi-Persistent Scheduling Activation with Single PDCCH, TSG-RF TSG RAN WG1 Meeting #53 BIS, Jun. 30-Jul. 4, 2008; (4PG).

Korean Office Action dated Nov. 9, 2015 issued in counterpart application No. 10-2009-0051596, 6 pages.

* cited by examiner

US 9,288,821 B2

METHOD AND APPARATUS FOR TRANSMITTING AND RECEIVING SCHEDULING ASSIGNMENTS IN A COMMUNICATION SYSTEM

PRIORITY

This application is a Continuation of U.S. application Ser. No. 13/705,803, which was filed in the U.S. Patent and Trademark Office on Dec. 5, 2012, which is a Continuation of U.S. application Ser. No. 12/560,876, (now U.S. Pat. No. 8,352,821), which was filed in the U.S. Patent and Trademark Office on Sep. 16, 2009, and claims priority under 35 U.S.C. §119(e) to U.S. Provisional Application No. 61/098,074, which was filed on Sep. 18, 2008, the content of each of which is incorporated herein by reference.

BACKGROUND OF THE INVENTION

1. Field of the Invention

The present invention is directed to control signaling in communication systems and, more specifically, to virtual length extension of a Cyclic Redundancy Check (CRC) by utilizing existing fields in control signaling, when the existing fields do not need to convey their intended information. The present invention is further considered in the development of the $3^{rd}$ Generation Partnership Project (3GPP) Evolved Universal Terrestrial Radio Access (E-UTRA) Long Term Evolution (LTE).

2. Description of the Art

A User Equipment (UE), also commonly referred to as a terminal or a mobile station, may be fixed or mobile and may be a wireless device, a cellular phone, a personal computer device, etc. A base station (Node B) is generally a fixed station and may also be referred to as a Base Transceiver System (BTS), an access point, or some other terminology.

The DownLink (DL) signals include data signals, control signals, and reference signals (also referred to as pilot signals). The data signals carry the information content and can be sent from the Node B to UEs through a Physical Downlink Shared CHannel (PDSCH). The control signals may be of broadcast or UE-specific nature. Broadcast control signals convey system information to all UEs. UE-specific control signals include, among others, the Scheduling Assignments (SAs) for DL data packet reception or UpLink (UL) data packet transmission and are part of the Physical Downlink Control CHannel (PDCCH). The Reference Signals (RS) serve multiple UE functions including channel estimation for PDSCH or PDCCH demodulation, measurements for cell search and handover, and Channel Quality Indication (CQI) measurements for link adaptation and channel-dependent scheduling.

The DL and UL data packet transmission (or reception) time unit is assumed to be a sub-frame.

A DL sub-frame structure is illustrated in FIG. 1 and corresponds to one of the structures used in the 3GPP E-UTRA LTE.

Referring to FIG. 1, the sub-frame includes 14 OFDM symbols 110. Each OFDM symbol is transmitted over an operating BandWidth (BW) including OFDM sub-carriers 120.

Further, 4 Node B transmitter antenna ports are assumed. The RS from antenna port 1, antenna port 2, antenna port 3, and antenna port 4 is respectively denoted as RS1 130, RS2 140, RS3 150, and RS4 160. The PDCCH and PDSCH multiplexing is in the time domain, with the PDCCH 170 occupying at most the first N OFDM symbols. At least the remaining 14-N ones are typically assigned to PDSCH transmission 180, but may occasionally contain transmission of synchronization and broadcast channels.

An OFDM transmitter is illustrated in FIG. 2.

Referring to FIG. 2, the OFDM transmitter includes a Coder and Interleaver 220, a Modulator 230, a Serial to Parallel (S/P) Converter 240, an Inverse Fast Fourier Transformer (IFFT) 250, and a Parallel to Serial (P/S) Converter 260. Information data 210 is first encoded and interleaved in Coder and Interleaver 220. For example, the coding may be performed using turbo coding (with a given redundancy version) and the interleaving may be performed using block interleaving. The encoded and interleaved data is then modulated by the Modulator 230, for example, using QPSK, QAM16, or QAM64 modulation. A serial to parallel conversion is then applied by the S/P Converter 240 to generate M modulation symbols, which are subsequently provided to the IFFT, which effectively produces a time superposition of M orthogonal narrowband sub-carriers. The M-point time domain blocks obtained from the IFFT 250 are then serialized by the P/S Converter 260 to create a time domain signal 270. The RS transmission can be viewed as non-modulated data transmission. Additional functionalities, such as data scrambling, cyclic prefix insertion, time windowing, filtering, etc., are well known in the art and are omitted for brevity.

The reverse functions are performed at an OFDM receiver as illustrated in FIG. 3.

Referring to FIG. 3, the OFDM receiver includes an S/P Converter 320, a Fast Fourier Transformer (FFT) 330, a P/S Converter 340, a Demodulator 350, and a Decoder and Deinterleaver 360. The received signal 310 is provided to the S/P Converter 320 to generate M received signal samples, which are then provided to the FFT 330. After the output of the FFT 330 is serialized by the P/S Converter 340, it is provided to the Demodulator 350 and then to the Decoder and Deinterleaver 360. Finally, the decoded data is obtained and Cyclic Redundancy Check (CRC) evaluation is performed to determine correct or incorrect reception.

Similarly to the OFDM transmitter illustrated in FIG. 2, well known in the art functionalities such as filtering, time-windowing, cyclic prefix removal, de-scrambling, channel estimation, etc., using the RS, are not shown for brevity.

An operating BW is divided into elementary scheduling units, referred to as Physical Resource Blocks (PRBs). For example, a PRB may include 12 consecutive OFDM sub-carriers. This allows the Node B to configure, through the PDCCH, multiple UEs to transmit or receive data packets in the UL or DL, respectively, by assigning different PRBs for packet transmission or reception from or to each UE, respectively. For the DL, this concept is illustrated in FIG. 4.

FIG. 4 is a diagram illustrating a scheduling of data packet transmissions to UEs in PRBs over one sub-frame.

Referring to FIG. 4, 5 out of 7 UEs are scheduled to receive PDSCH in one sub-frame 410 over 8 PRBs 420. UE1 430, UE2 440, UE4 450, UE5 460, and UE7 470, are scheduled PDSCH reception in one or more PRBs, while UE3 480 and UE6 490 are not scheduled any PDSCH reception. The allocation of PRBs may or may not be contiguous and a UE may be allocated an arbitrary number of PRBs (up to a maximum as determined by the operating BW and the PRB size).

FIG. 5 is a block diagram illustrating a coding process of an SA at the Node B. For the description of FIG. 5, it is assumed that the Node B separately encodes all SAs. The Medium Access Control (MAC) layer UE IDentity (UE ID), for the UE an SA is intended for, masks the CRC of the SA codeword in order to enable the reference UE to identify that the particular SA is intended for it.

Referring to FIG. 5, the CRC 520 of the (non-coded) SA bits 510 is computed and is subsequently masked 530 using an exclusive OR (XOR) operation between CRC bits and the MAC layer UE ID 540, where XOR(0,0)=0, XOR(0,1)=1, XOR(1,0)=1, XOR(1,1)=0. The masked CRC is then appended to the SA bits 550, channel coding is performed 560, for example, using a convolutional code, followed by rate matching 570 to the allocated PDCCH resources, interleaving and modulating 580, and transmission of the control signal 590 conveying the SA.

FIG. 6 is a block diagram illustrating a decoding process of an SA at the UE.

Referring to FIG. 6, the UE receiver performs the reverse operations of the Node B transmitter to determine whether the UE has an SA in a sub-frame. More specifically, the received control signal 610 is demodulated and de-interleaved 620. Rate matching applied in the Node B transmitter is restored at the UE by the rate matcher 630, and the data is subsequently decoded 640.

After decoding, the SA bits 660 are obtained, after extracting the CRC bits 650, which are then de-masked 670 by applying the XOR operation with the UE ID 680. Finally, the UE performs the CRC test 690. If the CRC test passes, the UE determines that the SA is valid and determines the parameters for signal reception (i.e., DL SA) or signal transmission (i.e., UL SA). However, if the CRC test does not pass, the UE disregards the SA.

Information Elements (IEs) in a DL SA and a UL SA are provided in Table 1 and are consistent with the ones used in 3GPP E-UTRA LTE. It is assumed herein that both the CRC and the UE ID consist of 16 bits.

The Cyclic Shift Indicator (CSI) IE specifies the cyclic shift applied in the Constant Amplitude Zero Auto-Correlation (CAZAC)-based sequence used to form the RS transmitted by the UE.

HARQ is assumed to apply for the data packets transmissions and the respective information is given by a corresponding IE (for the DL only as the UL HARQ process is assumed to be synchronous).

The New Data Indicator (NDI) IE specifies the beginning of a new Hybrid Automatic Repeat reQuest (HARQ) process and the Redundancy Version (RV) IE corresponds to data packet re-transmissions for the same HARQ process.

The CQI request IE indicates whether the UE should include or not a CQI report with its scheduled UL transmission.

The Modulation and Coding Scheme (MCS) IE specifies a modulation scheme, such as QPSK, QAM16, or QAM64, and a coding rate from a set of possible coding rates, for a predetermined coding method, such as turbo coding.

The Transmission Power Control (TPC) IE is associated with the application of power control for data or control signal transmissions from the reference UE.

One application of particular interest in communication systems is Voice over Internet Protocol (VoIP). Due to the large number of UEs that may typically require VoIP services, it is desirable to not send SAs to UEs in every sub-frame because the associated PDCCH overhead becomes excessively large, which affects the overall efficiency and throughput of the communication system. Accordingly, Semi-Persistent Scheduling (SPS) is used instead.

With SPS, data packet transmissions to or from VoIP UEs are activated once using an SA and subsequent initial packet transmissions continue periodically without new SAs (SAs

TABLE 1

Information Elements in DL SA and UL SA

| IE for DL SA | Number of Bits | IE for UL SA | Number of Bits | Comment |
| --- | --- | --- | --- | --- |
| Flag | 1 | Flag | 1 | To distinguish UL SA from DL SA (e.g. 0 for UL SA, 1 for DL SA) |
| PRB Allocation | 11 | PRB Allocation | 11 | Specified by ceil ($\log_2(N_{PRB}(N_{PRB}+1)/2)$) bits ($N_{PBR} = 50$ is assumed) |
| MCS | 5 | MCS | 5 | Modulation and Coding Scheme (MCS) Levels |
| HARQ Process | 3 | Cyclic Shift Indicator (CSI) | 3 | Hybrid Automatic Repeat reQuest (HARQ) process number in DL SA Cyclic Shift Indication for RS Transmission in UL SA |
| NDI | 1 | NDI | 1 | New Data Indicator |
| RV | 2 | CQI Request | 1 | HARQ Redundancy Version (RV) in DL SA Channel Quality Indicator (CQI) Transmission (yes/no) in UL SA |
| TPC | 2 | TPC | 2 | Transmission Power Control (TPC) commands |
| CRC (UE ID) | 16 | CRC (UE ID) | 16 | CRC masked by UE ID |
| Total Bits DL SA | 41 | Total Bits UL SA | 41 | 1 bit padding (fixed value) for UL SA to obtain same size with DL SA |

In Table 1, the operating BW is assumed to comprise of 50 PRBs and consecutive PRB assignment is considered as an example. For consecutive allocations over a maximum of $N_{PRB}$, the total number of combinations is determined as $1+2+\ldots+N_{PRB}=N_{PRB}(N_{PRB}+1)/2$ which can be signaled with an IE having ceil($\log_2(N_{PRB}(N_{PRB}+1)/2)$) bits, where the "ceil" operation rounds a number to its next integer.

may still be used for re-transmissions, if the initial transmission is incorrectly received). For the same UE, by using a different MAC UE ID, SPS SAs may be distinguished from SAs for dynamic scheduling, where each data packet transmission is associated with an explicit SA.

However, a consequence of separately encoding the SAs is that a UE then needs to perform multiple decoding operations and CRC tests in order to determine whether it has a valid DL SA or UL SA. Further, for the UEs without any SA, the decoding operations need to exhaust an entire search space in the PDCCH for possible SAs, before eventually determining that no SAs are directed to them. Consequently, this increases the number of decoding operations. For example, even if measures to limit its value are applied, as in EUTRA LTE, at least about 40 decoding operations may be required.

Assuming random PDCCH bits and a 16-bit CRC, a false positive SPS activation (CRC test incorrectly passes) from a UE without an SA occurs, on average, after $2^{16}$=65536 CRC tests. For a sub-frame duration of 1 millisecond and 40 decoding operations per sub-frame, the average time between false positive SPS activations is $2^{16}/40$ milliseconds or about 1.64 seconds. Although accounting for discontinuous packet reception for VoIP UEs or for the Voice Activity Factor (VAF) will somewhat increase the average time of consecutive false positive SPS activations, for example by a factor of about 10, this average time will still be in the order of seconds.

If an SPS UE (such as, for example, a VoIP UE) has a false positive SPS activation, the consequences depend on whether the SA is interpreted as a DL one or as a UL one. If a UE incorrectly determines that it has a DL SA, it will fail to decode the presumed data packet transmission from the Node B (because no such data packet exists) and it will periodically transmit a Negative ACKnowledgement (NACK) in the UL of the communication system. This NACK may collide with a NACK or with a positive ACKnowledgement (ACK) transmitted from a UE with valid PDSCH reception. This is problematic when the UE with the valid PDSCH reception transmits an ACK.

A more detrimental operating condition results when an SPS UE incorrectly determines that it has a UL SA. In this case, the UE will be transmitting data in the UL, which will interfere with data transmitted by one or more other UEs with valid SAs. The fundamental consequence of such interference is that the UL communication reliability for affected UEs either with valid SAs or with invalid SAs will be seriously compromised.

Therefore, there is a need to reduce the probability of false positive SPS activations for SPS UEs and respectively increase the time period between two successive CRC tests passing incorrectly.

There is another need to avoid increasing the CRC size in order to avoid increasing the associated overhead.

There is another need to maintain the same size between dynamic SAs and SPS SAs in order to minimize the decoding operations a UE needs to perform, thereby minimizing implementation complexity and power consumption.

SUMMARY OF THE INVENTION

Accordingly, the present invention has been designed to solve at least the aforementioned problems in the prior art and the present invention provides methods and apparatus for reducing the probability of false activations for Semi-Persistent Scheduling (SPS).

In accordance with an aspect of the present invention, a method is provided for receiving a Scheduling Assignment (SA) by a User Equipment (UE) in a communication system in which a base station transmits the SA being a first type or a second type, the SA including a set of Information Elements (IEs), and a first IE. The method includes receiving the SA; identifying that each bit included in the set of IEs of the SA and at least one bit included in the first IE of the SA are set with a predetermined value; and performing an action corresponding to the SA of the second type, if each bit included in the set of IEs of the SA and the at least one bit included in the first IE of the SA are set with the predetermined value.

In accordance with an aspect of the present invention, a User Equipment (UE) apparatus is provided for receiving a Scheduling Assignment (SA) in a communication system in which a base station transmits the SA being a first type or a second type, and the SA including a set of Information Elements (IEs) and a first IE. The UE apparatus includes a transceiver configured to receive the SA; a de-multiplexer configured to de-multiplex each bit included in the set of IEs of the SA and at least one bit included in the first IE of the SA; a comparator configured to identify if each bit included in the first IE of the SA and the at least one bit included in the first IE of the SA are set with a predetermined value; and a controller for performing an action corresponding to the SA of the second type of the UE, if each bit included in the set of IEs of the SA and the at least one bit included in the first IE of the SA are set with the predetermined value.

In accordance with an aspect of the present invention, a base station apparatus is provided for generating a Scheduling Assignment (SA) in a communication system in which a base station transmits the SA being a first type or a second type, and the SA including a set of Information Elements (IEs) and a first IE. The base station apparatus includes a controller configured to set each bit included in the set of IEs of the SA and at least one bit included in the first IE of the SA with a predetermined value, if the SA is of the second type; and a transceiver configured to transmit the SA to a User Equipment (UE).

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE EMBODIMENTS OF THE INVENTION

Figure 1:
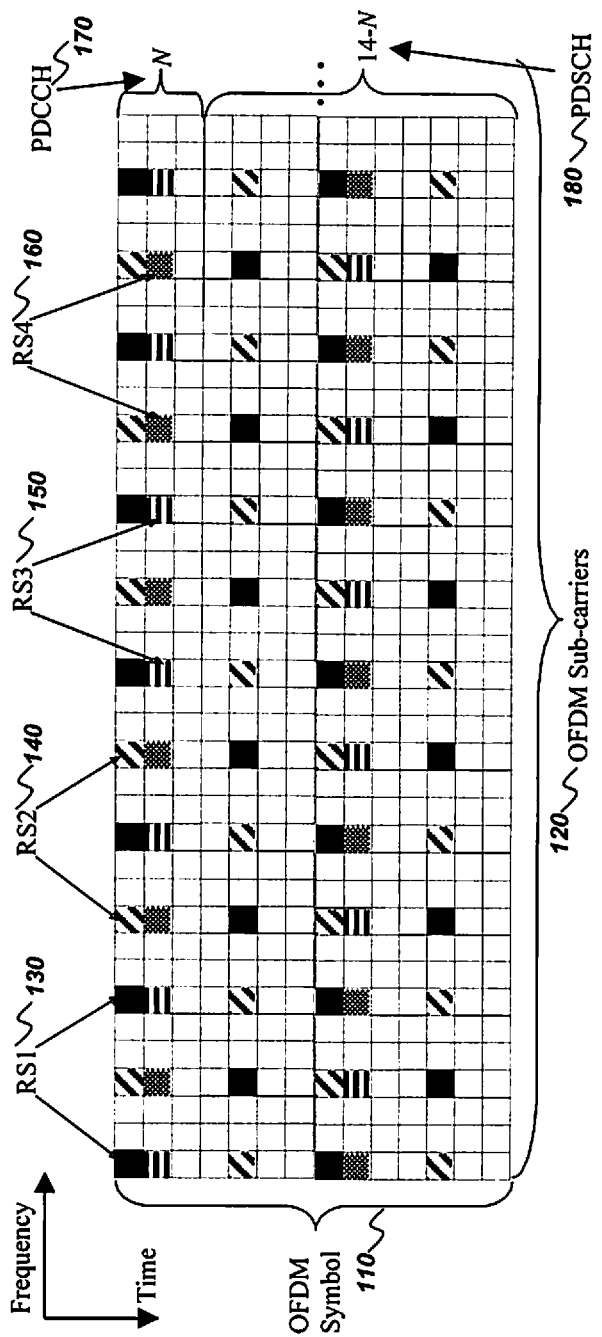
FIG. 1 is a diagram illustrating a DL sub-frame structure for an OFDMA communication system.
Figure 2:
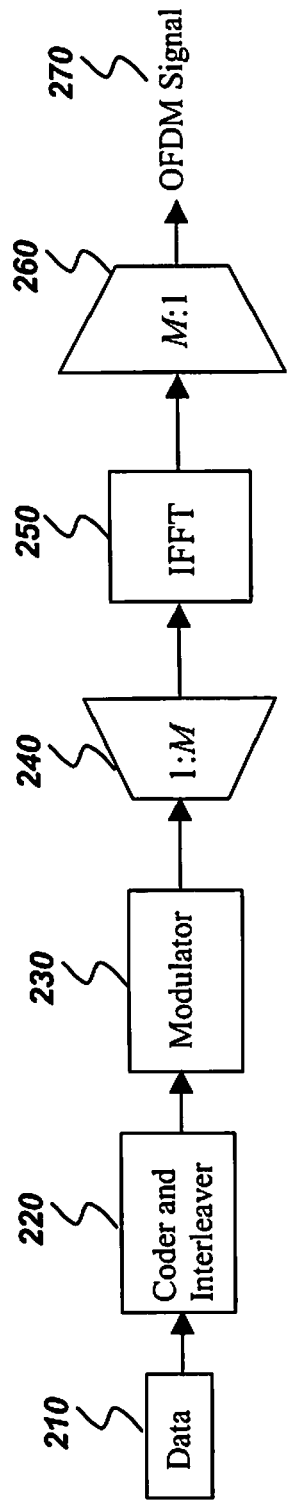
FIG. 2 is a block diagram illustrating an OFDM transmitter.
Figure 3:
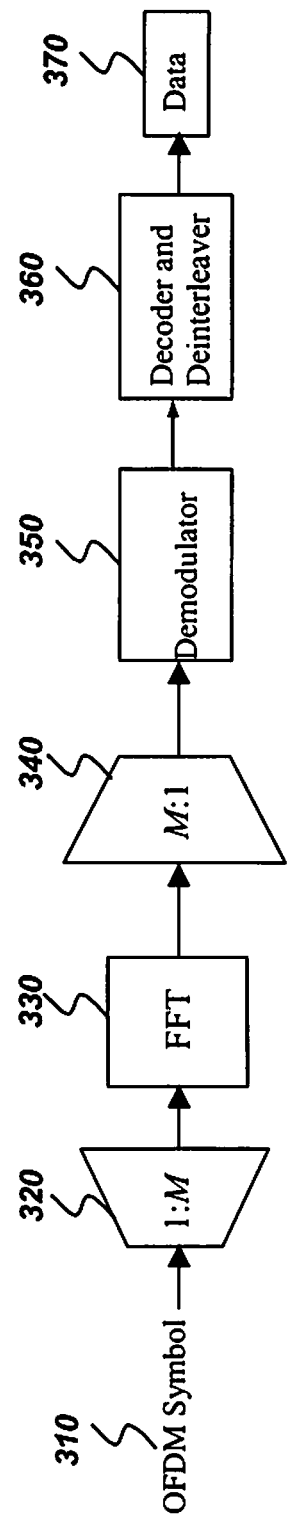
FIG. 3 is a block diagram illustrating an OFDM receiver.
Figure 4:
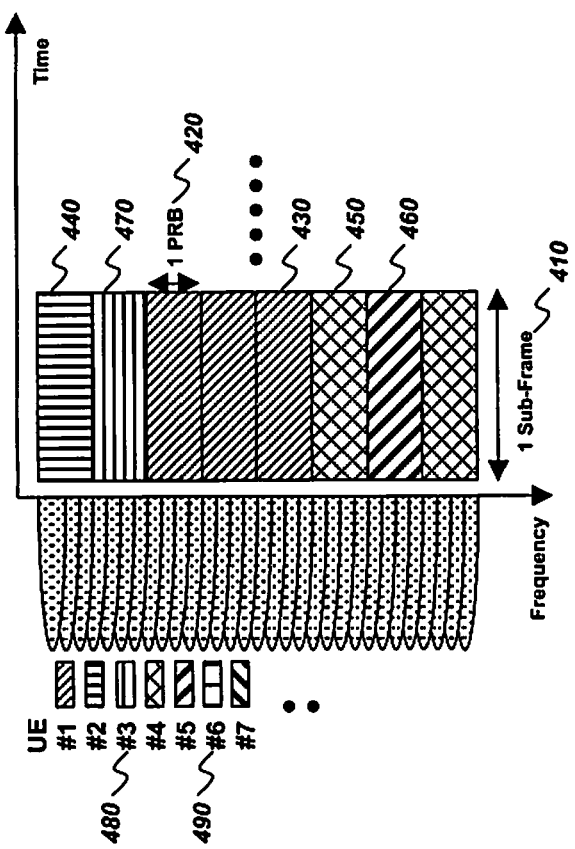
FIG. 4 is a diagram illustrating a scheduling of data packet transmissions to UEs in PRBs over one sub-frame.
Figure 5:
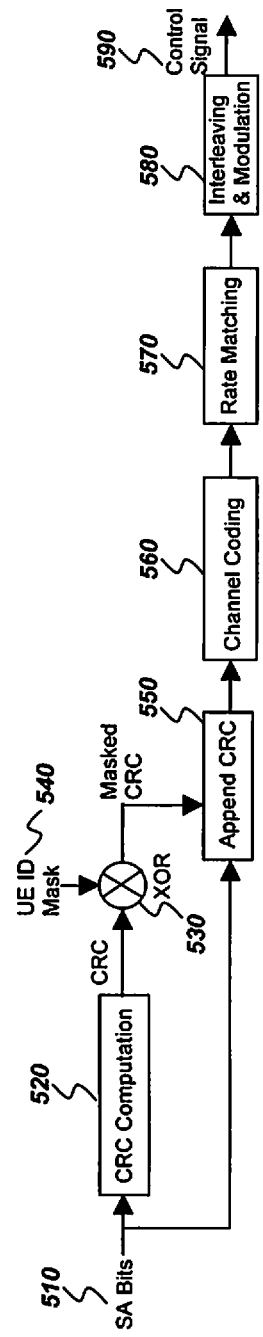
FIG. 5 is a block diagram illustrating a coding process of an SA at a Node B.
Figure 6:
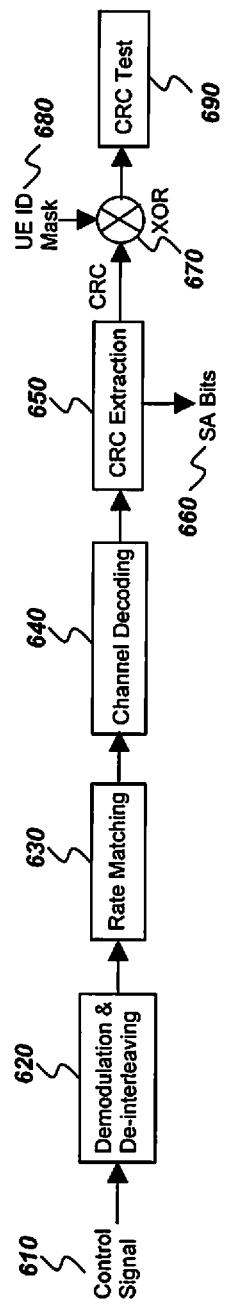
FIG. 6 is a block diagram illustrating a decoding process of an SA at a UE.

The present invention will now be described more fully hereinafter with reference to the accompanying drawings. This invention may, however, be embodied in many different forms and should not be construed as limited to the embodiments set forth herein. Rather, these embodiments are provided so that this disclosure will be thorough and complete and will fully convey the scope of the invention to those skilled in the art.

The present invention considers control signaling aspects for scheduling data packet transmissions from a base station (Node B) to User Equipments (UEs) and from UEs to their serving Node B. The former and latter data packet transmissions occur, respectively, in the DownLink (DL) and in the UpLink (UL) of the communication system. An exemplary embodiment assumes that the DL communication is based on Orthogonal Frequency Division Multiple Access (OFDMA) and the UL communication is based on Single-Carrier Frequency Division Multiple Access (SC-FDMA) as in 3GPP E-UTRA LTE.

Additionally, although the present invention is described in relation to an Orthogonal Frequency Division Multiple Access (OFDMA) communication system, it also applies to all Frequency Division Multiplexing (FDM) systems in general and to Single-Carrier Frequency Division Multiple Access (SC-FDMA), OFDM, FDMA, Discrete Fourier Transform (DFT)-spread OFDM, DFT-spread OFDMA, SC-OFDMA, and SC-OFDM in particular.

In accordance with the embodiments of the present invention, assuming the same format for Scheduling Assignments (SAs) for SPS and dynamic scheduling, a reduction in the probability of false SPS activations is achieved by reducing a dynamic range for certain Information Elements (IEs) in respective SAs. This reduction of dynamic range applies to IEs in SPS SAs for which support of the whole dynamic range is not useful.

For dynamic scheduling, substantially the whole dynamic range of these IEs, as specified by the number of respective bits, is allowed. By reducing the dynamic range of certain IEs in SAs for SPS, while maintaining the same total number of SA bits, one or more bits used to represent each of these IEs can be set to a fixed, predetermined value. These SA bits can therefore be used to virtually extend the length of the Cyclic Redundancy Check (CRC) for the respective SA, thereby reducing the probability of false SPS activation.

The present invention also provides structures for the DownLink (DL) SA and for the UpLink (UL) SA and identifies IEs in the DL SA and the UL SA, which could be reduced in range when used for SPS.

As described above, the present invention considers the virtual CRC extension in DL SAs and UL SAs for SPS in order to reduce the probability of false positive SPS activations. The objective is to reduce the probability of false positive CRC tests for SPS SAs, while maintaining the same physical CRC size (for example, 16-bits), thereby avoiding an increase of the CRC overhead and maintaining the same size for SPS SAs and dynamic SAs.

As SPS SAs are primarily intended for services with small data packet payloads, such as for example VoIP, several of the values for some of the IEs in the DL SA on in the UL SA, as described in Table 1, are not essential or even useful for SPS data packet transmission in the DL or in the UL, respectively, of the communication system. Accordingly, in accordance with an embodiment of the present invention, these IEs are identified and set to a fixed value.

Figure 7:
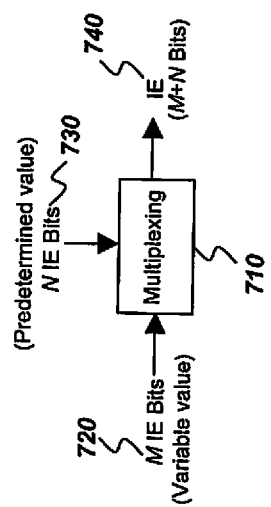
FIG. 7 is a block diagram illustrating multiplexing of IE bits in SPS SAs in accordance with an embodiment of the present invention.

FIG. 7 is a block diagram illustrating multiplexing of IE bits in SPS SAs in accordance with an embodiment of the present invention. More specifically, the virtual CRC extension at the Node B transmitter is illustrated in FIG. 7.

Referring to FIG. 7, for SPS SAs, at least one IE may be obtained from the multiplexing 710 of M IE bits 720 with variable value and N IE bits 730 with predetermined value, producing the IE with a total of M+N bits 740. This IE size is the same as the one for dynamic SAs, with the only difference being that the N bits with predetermined value for SPS SAs have variable value for dynamic SAs. Other IEs in SPS SAs may have no predetermined bits and, in that sense, may be the same as respective IEs for dynamic SAs. The IEs having bits with predetermined value are known in advance by both the Node B and the UE.

Figure 8:
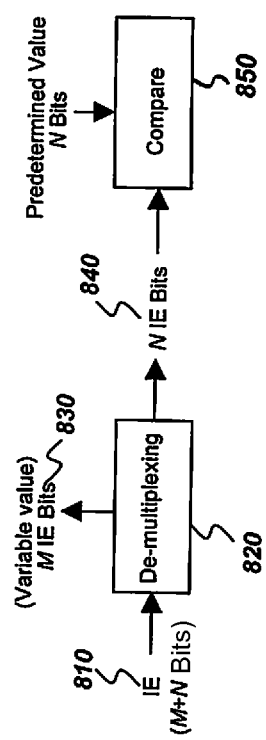
FIG. 8 is a block diagram illustrating de-multiplexing of IE bits in SPS SAs in accordance with an embodiment of the present invention.

FIG. 8 is a block diagram illustrating de-multiplexing of IE bits in SPS SAs in accordance with an embodiment of the present invention. That is, the virtual CRC extension at the UE receiver is illustrated in FIG. 8.

Referring to FIG. 8, for the IE transmitted as illustrated in FIG. 7, the UE receiver obtains the M+N IE bits 810, after decoding. De-multiplexing 820 is subsequently applied to separate the M IE bits 830 carrying information (can have variable value) and the N IE bits 840 expected to have a predetermined value. The UE receiver then compares 850 the value of the N IE bits to their predetermined value and disregards the SA, if these two values are not the same. For multiple IEs having predetermined values, all these values may be combined into one (and may also include the physical CRC). Alternatively, the multiple IEs may be viewed as a single combined IE having predetermined values for some specific, possibly non-consecutive, bits.

For a UE having a false positive CRC test, the SA IEs having bits that are set to have a predetermined value will instead have random values after decoding, and therefore, the UE can disregard the SA. In this manner, erroneous system operation in the DL or in the UL of the communication system is avoided and the CRC length is virtually extended. As previously described, this is only applicable to SPS SAs. For dynamic SAs these bits convey useful information and can therefore have variable values (otherwise, the inclusion of such bits in the IEs of the SAs is redundant).

By virtually extending the CRC length through the setting a total of Q bits in some IEs of the DL SA or of the UL SA to a fixed value, the probability of a false CRC positive check is reduced by a factor of $2^Q$. For example, if Q=8, the probability of a false CRC positive check is reduced by a factor of 256. In this manner, these bits of SA IEs serve as a virtual CRC bits for SPS SAs and reduce the probability of false positive CRC tests.

Considering the UL SA, a first IE that is not useful in its entirety to SPS data packet transmissions is the Cyclic Shift Indicator (CSI). The purpose of the CSI is to assign a cyclic shift to the UL RS transmission, which is, for example, based on Constant Amplitude Zero Auto-Correlation (CAZAC) sequences. By indicating different cyclic shift values, the CSI orthogonally distinguishes UL RS from UEs sharing the same PRBs for their UL signal transmissions in conjunction with the use of Multi-User Multiple Input Multiple Output (MU-MIMO) or Spatial Domain Multiple Access (SDMA) transmissions. Having orthogonal UL RS among UEs participating in SDMA enables the Node B to obtain accurate channel estimation for the signal transmitted by each UE, which in turn, enables the subsequent separation of the mutually interfered data signals transmitted from the SDMA UEs. However, for SPS services, such as VoIP services, that have small payloads and require a small number of PRBs for the data packet transmissions, SDMA is not useful. Therefore, in accordance with an embodiment of the present invention, for SPS SAs, the 3 bits used to convey the CSI in the UL SA, as outlined in Table 1, are set to a fixed value such as zero.

A second IE, which can be reduced in scope for SPS SAs, is the MCS IE, which in conjunction with the IE specifying the total number of PRBs allocated to a UE, determines the transport format size. The reasoning is the same as before in that SPS services are associated with small data packet payloads and therefore, signaling of the largest MCS values is not useful for SPS SAs. Consequently, a few bits, such as for example 1 bit or 2 bits from the 5 bits in the MCS IE of Table 1, can be always set to a fixed value in SPS SAs, such as for example to a value of zero.

A third IE that is not useful for SPS UL SAs is the CQI report request, which in Table 1 is assumed to be signaled using 1 bit. Again, considering that services with SPS SAs utilize a small number of PRBs, accompanying data packet transmissions with CQI transmission is not efficient as the resources are limited and the CQI transmission punctures data transmission. Therefore, the CQI report trigger bit of Table 1 can always be set to a fixed value in SPS SAs, for example, to a value of zero.

Following the same principles exploiting the nature of services using SPS to reduce the scope of some IEs in SPS SAs, relative to their scope in dynamic SAs, another IE in SPS SAs that can have a reduced scope is the PRB allocation IE. Again, because SPS services utilize a small number of PRBs then, depending on the PRB size and the operating bandwidth, the number of bits required to address this smaller number of PRBs can be much smaller than the total number of PRBs. For example, 2 to 3 bits from the PRB allocation IE of the UL SA of Table 1, can always be set to a fixed value in SPS SAs, such as to a value of zero. This can be continued to include other IEs in the UL SA for SPS and therefore, in Table 1, the total number of bits in the UL SA which can be set to a fixed value, thereby providing virtual extension of the CRC, is about 8.

The same concept directly extends to the DL SAs for SPS. A first IE with reduced scope can be the MCS where 1 or 2 bits from the 5 bits can be set to a fixed value as explained for the UL SA.

Similarly, a second IE can be the PRB allocation field where 2 to 3 bits can be set to a fixed value. Reducing the scope of the MCS and PRB allocation IEs in the DL SA is equivalent to reducing the scope of the transport block size, as SPS services are associated with small payload sizes.

Because SPS SAs are associated with initial transmissions (re-transmissions are assumed to have explicit SA in the DL), another IE that can be set to a fixed value in the DL SA for SPS is the HARQ redundancy version IE, thereby proving 2 additional bits for virtual CRC extension.

In summary, with respect to Table 1, the IEs and the corresponding number of bits in the DL SA and UL SA that can be set to a fixed value for SPS SAs are outlined below in Table 2. The total number of bits that can be set to a fixed value for SPS SAs is about 6 for DL SAs and about 8 for UL SAs, which leads to a respective reduction in the probability of false positive CRC tests by a factor of $2^6=64$ for DL SAs and a factor of $2^8=256$ for UL SAs. Having different time periods between two successive false positive SPS activations for DL SAs and UL SAs is not an issue, particularly because the probability of false positive SPS activations for the UL SAs is smaller, as the ramifications of false positive SPS activations are more severe in case of UL SAs as it was previously discussed.

TABLE 2

IEs with Reduced Scope and Respective Number of Bits with Fixed Value in DL SA and UL SA for SPS.

| IE for DL SA | Number of Bits with Fixed Value | IE for UL SA | Number of Bits with Fixed Value | Comment |
|---|---|---|---|---|
| PRB Allocation | 3 | PRB Allocation | 3 | SPS SAs PRB Allocation need not include all PRBs |
| MCS | 1 | MCS | 1 | SPS SAs need not include highest MCS |
|  |  | Cyclic Shift Indicator (CSI) | 3 | CSI need not be different among SPS UEs |
| RV | 2 | CQI Request | 1 | HARQ RV can be set to 00 in DL SAs for SPS No CQI transmission request in UL SAs for SPS |
| Total Bits DL SA | 6 | Total Bits UL SA | 8 |  |

Figure 9:
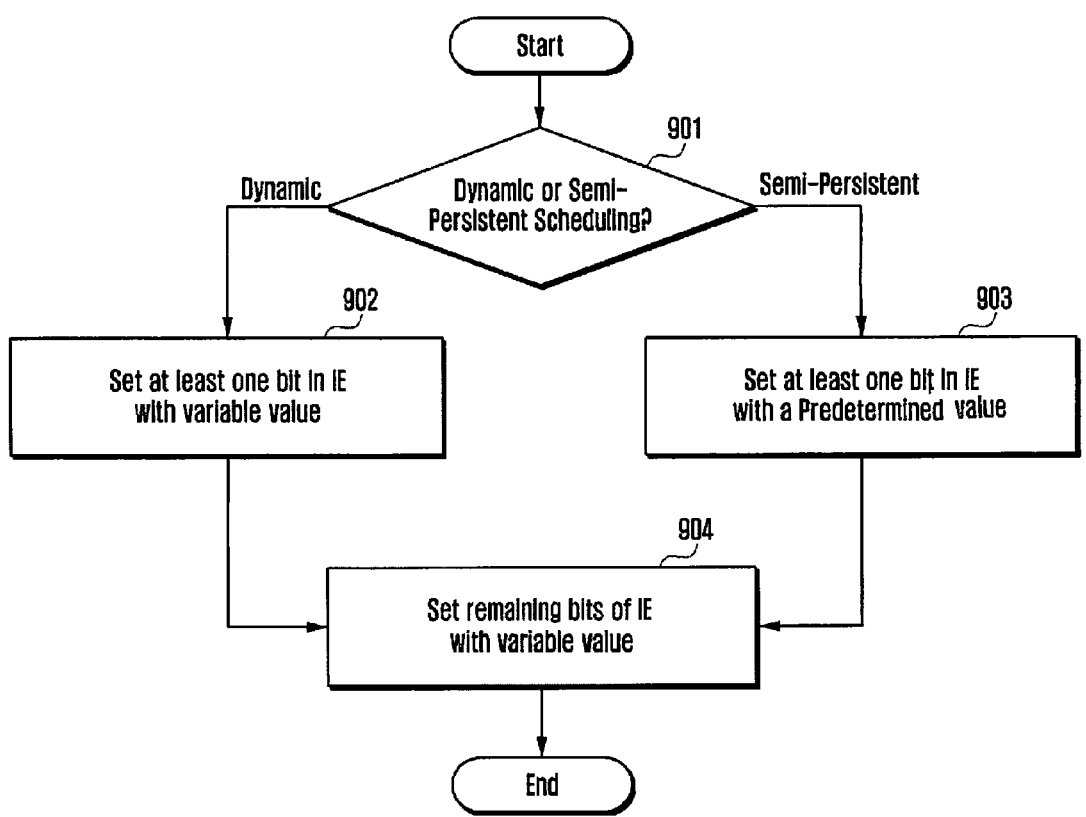
FIG. 9 is a flowchart illustrating a method of generating an SA in accordance with an embodiment of the present invention.

FIG. 9 is a flowchart illustrating a method of generating an SA in accordance with an embodiment of the present invention.

Referring to FIG. 9, in step 901, a base station determines whether dynamic or semi-persistent scheduling will be performed. When dynamic scheduling is performed, the base station sets at least one bit in an IE with a variable value in step 902. However, when semi-persistent scheduling is performed, the base station sets at least one bit in the IE with a predetermined value. Thereafter, the base station sets any remaining bits in the IE with variable values.

Figure 10:
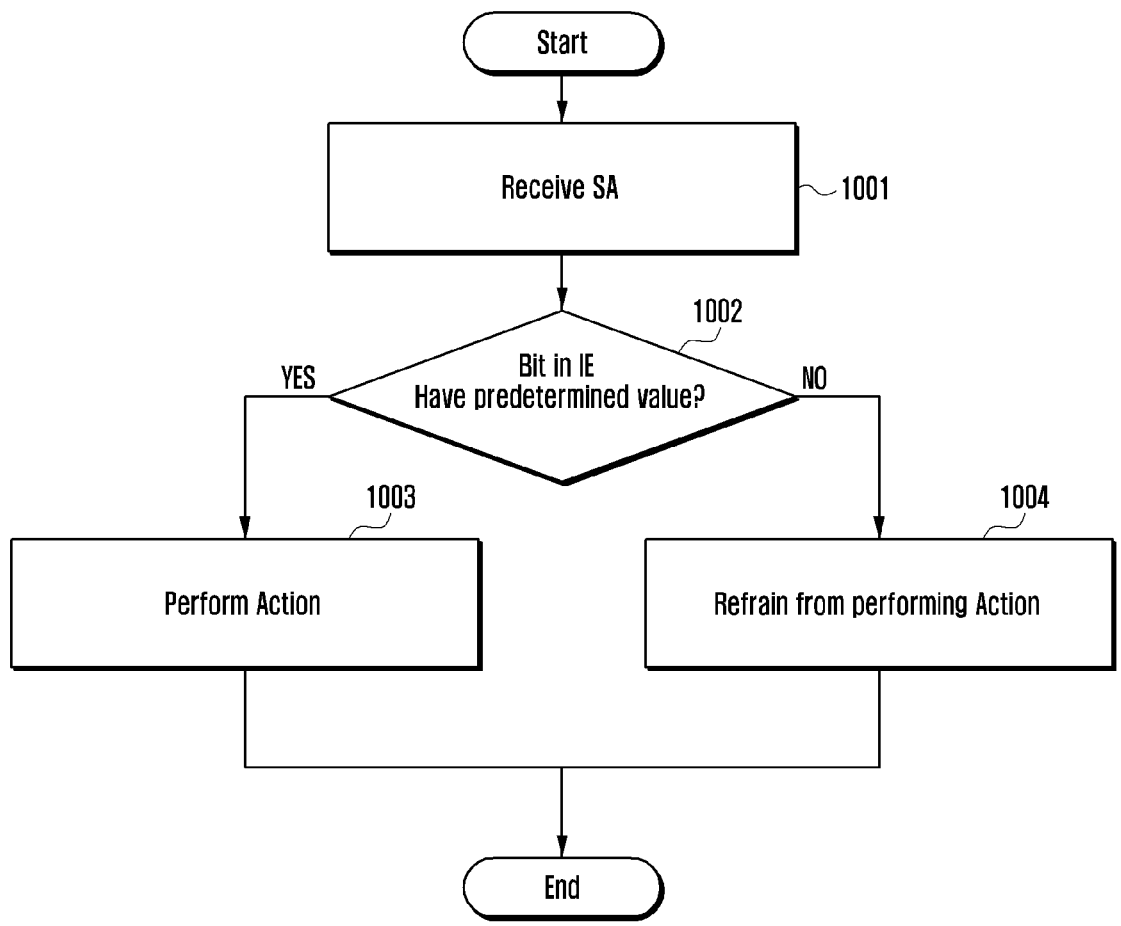
FIG. 10 is a flowchart illustrating a method of reducing a probability of incorrectly performing an action by a UE in response to a reception of an SA in accordance with an embodiment of the present invention.

FIG. 10 is a flowchart illustrating a method of reducing a probability of incorrectly performing an action by a UE in response to a reception of an SA in accordance with an embodiment of the present invention.

Referring to FIG. 10, the UE receives the SA in step 1001. In step 1002, the UE determines if a bit in an IE has a predetermined value. The UE performs the action in step 1003, if a bit in the IE has the predetermined value, or refrains from performing the action in step 1004, if the bit in the IE does not have the predetermined value.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method, by a terminal, for receiving a scheduling assignment (SA) being a first scheduling type or a second scheduling type in a communication system, the method comprising:
    receiving the SA including a plurality of information elements (IEs);
    validating whether the SA is the second scheduling type based on the received SA; and
    performing an action corresponding to the SA of the second scheduling type if the validation is achieved,
    wherein the validation is achieved if each bit included in a first IE of the plurality of IEs and a predefined bit included in a second IE of the plurality of IEs are set with a first value.

2. The method of claim 1, wherein the SA of the first scheduling type is for dynamic scheduling and the SA of the second scheduling type is for semi-persistent scheduling.

3. The method of claim 1, wherein performing the action comprises one of:
- transmitting a data signal based on the received SA; and
- transmitting an acknowledgement signal in response to the received SA.

4. The method of claim 1, further comprising:
- disregarding the SA, if any bit included in the first IE of the plurality of IEs or the predefined bit in the second IE of the plurality of IEs is not set with the first value.

5. The method of claim 1, wherein the first IE of the plurality of IEs includes at least one of a cyclic shift indicator and a transmit power control (TPC) command, and
- wherein the second set of one or more IEs of the SA includes a modulation and coding scheme.

6. The method of claim 1, wherein the first set of one or more IEs of the SA includes a redundancy version, and
- wherein the second IE of the plurality of IEs includes a modulation and coding scheme.

7. A terminal for receiving a scheduling assignment (SA) being a first scheduling type or a second scheduling type in a communication system, the terminal comprising:
- a transceiver configured to receive the SA including a plurality of information elements (IEs); and
- a controller configured to validate whether the SA is the second scheduling type based on the received SA, and to perform an action corresponding to the SA of the second scheduling type if the validation is achieved,
- wherein the validation is achieved if each bit included in a first IE of the plurality of IEs and a predefined bit included in a second IE of the plurality of IEs are set with a first value.

8. The terminal of claim 7, wherein the SA of the first scheduling type is for dynamic scheduling and the SA of the second scheduling type is for semi-persistent scheduling.

9. The terminal claim 7, wherein the action includes data signal transmission based on the received SA or transmission of an acknowledgement signal in response to the received SA.

10. The terminal claim 7, the controller is further configured to disregard the SA, if any bit included in the first IE of the plurality of IEs or the predefined bit in the second IE of the plurality of IEs is not set with the first value.

11. The terminal claim 7, wherein the first IE of the plurality of IEs includes at least one of a cyclic shift indicator and a transmit power control (TPC) command, and
- wherein the second IE of the plurality of IEs includes a modulation and coding scheme.

12. The terminal claim 7, wherein the first IE of the plurality of IEs includes at least one of a redundancy version and a hybrid automatic repeat request (HARQ) process number, and
- wherein the second IE of the plurality of IEs includes modulation and coding scheme.

* * * * *